(12) United States Patent
Pekerman

(10) Patent No.: US 8,909,549 B2
(45) Date of Patent: Dec. 9, 2014

(54) MOBILE DEVICE TIME TRACKING SYSTEM AND METHOD

(75) Inventor: Ludmila Pekerman, Richmond Hill (CA)

(73) Assignee: 6989837 Canada Ltd., Richmond Hill (CA)

( * ) Notice: Subject to any disclaimer, the term of this patent is extended or adjusted under 35 U.S.C. 154(b) by 202 days.

(21) Appl. No.: 13/282,984

(22) Filed: Oct. 27, 2011

(65) Prior Publication Data

US 2012/0143734 A1    Jun. 7, 2012

Related U.S. Application Data

(63) Continuation of application No. PCT/CA2010/000594, filed on Apr. 21, 2010.

(30) Foreign Application Priority Data

May 1, 2009   (CA) ..................................... 2665213

(51) Int. Cl.

| | | |
|---|---|---|
| G06F 15/02 | (2006.01) | |
| G06Q 40/00 | (2012.01) | |
| H04L 12/14 | (2006.01) | |
| H04W 24/00 | (2009.01) | |
| H04W 8/26 | (2009.01) | |
| H04W 12/02 | (2009.01) | |

(52) U.S. Cl.
CPC ................ H04L 12/14 (2013.01); G06Q 40/10 (2013.01); *H04W 24/00* (2013.01); *H04W 8/26* (2013.01); *H04W 12/02* (2013.01)
USPC .............................................. 705/32; 705/50

(58) Field of Classification Search
CPC ....................................................... G06Q 40/10
USPC .................................... 705/32, 50, 418
See application file for complete search history.

(56) References Cited

U.S. PATENT DOCUMENTS

| | | | | |
|---|---|---|---|---|
| 2009/0234780 | A1* | 9/2009 | Drucker et al. ............... | 705/418 |
| 2009/0291665 | A1 | 11/2009 | Gaskarth et al. | |

(Continued)

FOREIGN PATENT DOCUMENTS

| | | |
|---|---|---|
| CA | 2665213 A1 | 11/2010 |
| GB | 2483188 A | 2/2012 |
| WO | 2010124363 A1 | 11/2010 |

OTHER PUBLICATIONS

Canadian International Patent Application No. PCT/CA2010/000594. International Preliminary Report on Patentability and Written Opinion. Dated Nov. 1, 2011.

(Continued)

*Primary Examiner* — Ryan Zeender
*Assistant Examiner* — Hunter Wilder
(74) *Attorney, Agent, or Firm* — Bereskin & Parr LLP/S.E.N.C.R.L., s.r.l.

(57) ABSTRACT

Systems and methods for the automated recording of time entries by a mobile device of interactions between a professional and other parties occurring on that device on behalf of a client of the professional are described. File information is automatically retrieved from a first server based on identifying information associated with an interaction, and the recording of the file number, as selected from candidates presented to the professional, along with the duration of the interaction, a description of the interaction and identifiers for the professional and the other party in a time entry that may then be buffered on the first server prior to transmission to a billing server. Encrypted sensitive information may be stored on the first server, which may thereby be operated by a third party and shared with other professionals.

34 Claims, 2 Drawing Sheets

(56) References Cited

U.S. PATENT DOCUMENTS

2010/0198730 A1* 8/2010 Ahmed et al. .................. 705/50
2010/0211486 A1* 8/2010 Abrashkin et al. .............. 705/32

OTHER PUBLICATIONS

Canadian International Patent Application No. PCT/CA2010/000594. International Search Report. Dated Jul. 13, 2010.
Laurams and Hill, S., "Momentum for Blackberry Helps You Track Your Momentum" Brighthub [online], Nov. 20, 2008 [retrieved on Jun. 30, 2010]. Retrievable from the Internet:<URL: http://brighthub.com/mobile/blackberry-platform/articles/15762.aspx.>.
Squillante, N., "Chrometa 1.1: Read Our Exclusive Report" TechnoLawyer Blog [online], Jun. 3, 2009 [retreived on Jun. 30, 2010]. Retrieved from the Internet:<URL: http://blog.technolawyer.com/2009/06/chrometa.html>.
Chrometa v1.1, made public on Apr. 30, 2009 accessed on Jun. 30, 2010 <URL: http://www.chrometa.com/about.php>.
Examination Report. Pending UK Patent Application No. GB1120452.6. Dated Jul. 25, 2013.

* cited by examiner

US 8,909,549 B2

MOBILE DEVICE TIME TRACKING SYSTEM AND METHOD

CROSS-REFERENCE TO RELATED APPLICATIONS

This application is a continuation of International Application No. PCT/CA2010/000594, filed Apr. 21, 2010, which claims priority to Canadian patent application No. 2,665,213, filed May 1, 2009. The entire contents of International Application No. PCT/CA2010/000594 and Canadian patent application No. 2,665,213 are hereby incorporated by reference.

FIELD

The described embodiments relate to the field of mobile device applications and more specifically to a system and method for tracking time spent related to communications using a mobile device.

BACKGROUND

Communications between professionals and their clients, or with others on behalf of clients, are frequently carried out on mobile hand-held devices, such as smart phones. This is typically done when a professional is out of the office and is without access to his or her time reporting system, so that the time spent on such communications may not be accurately recorded. Professionals often bill clients on the basis of the amount of time spent on activities on behalf of the client, and, as such, it is important that a professional accurately records as much of such time as possible.

Many systems have been developed to record professionals' time on a computer. Clients are generally assigned client numbers, and may also be assigned matter or file numbers for particular tasks. A typical time reporting system facilitates recording the amount of time a professional spends on a particular matter by recording, for each continuous activity performed on that matter, or for all such activities related to a matter performed in a day, the time spent along with the matter number and a description of the work performed. Such time records may be periodically transmitted to a billing system that incorporates into each client's bill a charge for the activity described in each time record based on the amount of time spent and the professional's billing rate.

Some systems have attempted to capture billable time while using a mobile device by the use of an application that resides on the mobile device and records the durations of calls. Such systems typically require the professional to manually enter client or file identification information into the mobile device. This can be difficult for professionals who deal with many clients or where clients may have many ongoing matters. Some systems have attempted to address these problems by caching client or matter numbers, and associated descriptions, associated with particular telephone numbers or e-mail addresses on the mobile device. However this still requires the professional to enter the information into the mobile device initially, whenever any new matter arises and whenever an entry has been removed from the cache because of space limitations. Such systems also do not automate entry of a description of the interaction.

Some such prior art systems have provision for automatically transmitting time records back to a server. Recognizing that such transmissions may overtax the capacity of a professional firm's servers, some systems incorporate a third party server for collection of time records. This approach creates the problem of placing sensitive, confidential or privileged information in the hands of a third party.

SUMMARY

The invention relates to a method of automatically creating a field-delimited time entry on a mobile device used by a professional, having a professional identifier, from an interaction occurring on the mobile device with an other party on behalf of a client of the professional, the method comprising:
   a. determining on the mobile device, by parsing data of the professional's interaction using the mobile device with the other party, an other party identifier used in the interaction;
   b. encrypting the other party identifier to make an encrypted index;
   c. querying a first server with the encrypted index to determine a subset of possible file numbers pertaining to the interaction;
   d. receiving from the professional a selection of one of the file numbers pertaining to the interaction or a new file number entered by the professional;
   e. determining by a timer in the mobile device a duration of the interaction;
   f. generating an initial description of the interaction based on the type of interaction to create an interaction description; and
   g. combining into a string for transmission to a second server for posting as a time entry at least each of the following fields: the other party identifier; the selected file number; the professional identifier; the interaction description; and the duration of the interaction.

The invention also relates to a system that implements such a method, having processing modules that implement the steps of the method.

According to alternate embodiments of the invention, the string may be encrypted and may be an XML string containing XML tags to delimit the fields. The other party identifier may be an e-mail address, telephone number, or other suitable identifier. Selected file numbers may be cached on the mobile device for use in future queries. The duration of an interaction may be calculated based on start and end times of an interaction and may take into account pauses or interruptions. The end time may be the time that a telephone call is disconnected or an e-mail is closed or sent, or may be otherwise specified by the professional. The interaction description may include text from an e-mail or text entered by the professional, and may include a voice recording made by the professional. The first server may also provide a client name and a mandate description which is inserted into the interaction description. The professional may also be able to electronically query an assistant for a portion of the interaction description.

DESCRIPTION OF EXEMPLARY EMBODIMENTS

Figure 1:
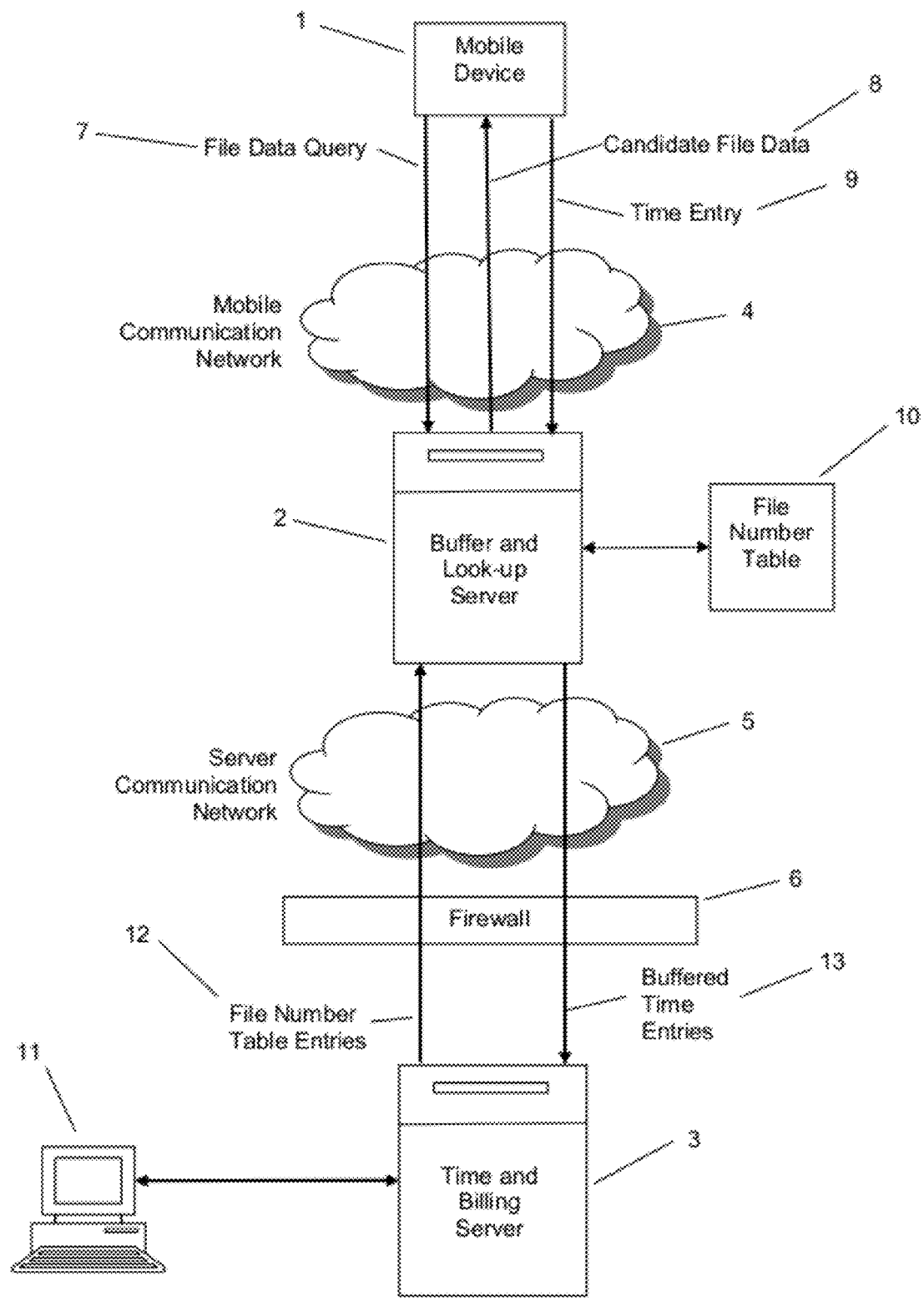
FIG. 1 is a block diagram of a preferred embodiment of the system showing the major data flows.

In a preferred embodiment shown in FIG. 1, mobile devices 1 are in electronic communication with a buffer and look-up server 2, which is in turn in electronic communication with a time and billing server 3. A mobile device 1 is a portable device, such as a mobile telephone or smart phone, capable of communicating with the buffer and look-up server 2 via a mobile communication network 4. A mobile device 1 may also be a laptop computer or similar device with a network connection. The mobile device 1 is used by a user, who may be a professional such as a lawyer, to communicate with users of other communication devices (other parties). Other parties may be, for example, clients, agents of clients, other professionals, colleagues or friends of the professional. Such communications between users may involve, for example, voice calls and transmission of electronic mail (e-mail).

Each such communication is an interaction that has a duration that is calculated by a timer function in the mobile device 1. In the case of a voice call, the duration may be, for example, the length of time from (1) a start time being the time the initiator of the call looked up the recipient's telephone number, pushed the button corresponding to the first number in the recipient's telephone number or finished dialing the number, or the time the recipient answered the call, until (2) an end time being the time the call was disconnected. In the case of an e-mail being sent by the professional, the duration may be the length of time from a start time being the time the professional instructed the mobile device 1 to initiate a new e-mail message until an end time being the time the e-mail is sent, and the duration may be adjusted based on information as to other activities the professional engaged in during that period, such as taking a voice call or other interruptions or pauses that can be identified. In the case of an e-mail received by the professional, the duration may be the length of time between a start time being the time the professional opened the e-mail for reading until an end time being the time the professional closed the e-mail or the time the professional initiated or completed a reply or forward, and the duration may be adjusted based on information as to other activities the professional engaged in during that period. Alternatively, the end time of a transaction may be indicated directly by the professional.

The mobile communication network 4 may be a wireless network that communicates directly with the mobile device 1 interfaced to the internet by a wireless carrier whereby the buffer and look-up server 2 can communicate with the mobile device 1 over the internet. The server communication network 5 may be the internet, interfaced to local area networks to which the buffer and look-up server 2 and time and billing server 3 are connected. Such local area networks may be partially isolated from the internet by a firewall 6 that mediates the flow of traffic between the local area network and the server communication network 5.

Each of the mobile devices 1, buffer and look-up server 2 and time and billing server 3 may include at least one general-purpose programmable processor running software, and may include special-purpose processors to perform functions such as encryption. The use of special purpose processors and custom or customized hardware to implement the invention is also possible. Software on the mobile device 1 monitors the professional's activities to identify interactions. An interaction may be a billable event for which the professional can charge a client on the basis of the duration of the interaction, or an interaction that is tracked although it is non-billable/non-chargeable. The software running on the mobile device 1 may facilitate such billing by creating a time entry 9 that records information including, without limitation, the start date and time of the interaction, the duration of the interaction, an other party identifier 21, a client number, a file number, a professional identifier, and an interaction description. Other information may also be incorporated into a time entry 9, such as an indication that a particular interaction is or is not billable.

On the initiation of an interaction, or thereafter, the mobile device 1 software records the start time of the interaction and initiates a time entry 9. It may also record in the time entry 9 the other party identifier 21 and professional identifier, and generate an interaction description. The other party identifier 21 may be the telephone number or e-mail address of the other party participating in the interaction, or another identifier such as a PIN corresponding to the other mobile device, a URL, etc. The professional identifier may be the professional's e-mail address, or a unique number assigned to the professional or to the mobile device 1. The interaction description may be a string of text indicating the type of interaction and specifying which party initiated (or received) the interaction. In the case of an e-mail, the interaction description may also include the e-mail subject line and may include text extracted from the body of the message. The interaction description may also incorporate other information available in the candidate file data 8, such as the client's name or a mandate description that describes the task associated with the file number.

During or after the interaction, the mobile device 1 software may retrieve candidate file data 8 from the buffer and look-up server 2 by transmitting a file data query 7 to the buffer and look-up server 2. The file data query may include an encrypted index 23 derived from the other party identifier 21. The encrypted index 23 is an identifier that is unique to the other party, or virtually unique so that the probability of any other party having the same encrypted index 23 is extremely small, such that a third party would be very unlikely to be able to determine whom the encrypted index 23 identifies. Such an encrypted index 23 may be generated by the mobile device 1, for example, by encrypting the other party identifier 21 or by computing a cryptographic hash of the other party identifier 21. Encryption may be done using any suitable encryption algorithm using a key that may be unique to the professional's firm, to the professional or to the mobile device 1. There are many suitable symmetric encryption algorithms such as AES (Rijndael), 3DES (or Triple-DES), Blowfish, Twofish, IDEA, CAST and Serpent. There are many suitable cryptographic hashing algorithms such as MD4, MD5, SHA-1 and SHA-2. There are many suitable public key encryption algorithms such as RSA, Diffie-Hellman, and various elliptic curve techniques.

The buffer and look-up server 2 preferably uses a file number table 10 that is indexed by such encrypted indexes 23 and contains candidate file data 8 for each encrypted index 23. The candidate file data 8 may include one or more client or file numbers, with associated descriptions, that identify files or tasks of the professional that may be associated with the other party. The file numbers contained in the candidate file data 8 may be a subset of all the file numbers contained in the professional's time and billing database. The candidate file data 8 may also include the client's name or other information that may be useful in identifying the correct file number or in creating an interaction description. The candidate file data 8 may be stored on the buffer and look-up server 2 and transmitted to the mobile device 1 in an encrypted form or as plain text. The candidate file data 8 may be formatted as an XML string using tags to identify the client numbers or file numbers and other information fields contained in the candidate file data 8. If the candidate file data 8 is encrypted, the mobile device 1 decrypts the candidate file data 8 using a key stored in the mobile device 1.

An example of an unencrypted XML string encoding candidate file data 8 is:

```
<sepIlSrs>
    <sepIlSr>
        <client clientID="543" clientName="Some Corporation">
            <mandate mandateId="84738"
                mandateDesc="Sarbanes-Oxley Advisory"/>
            < mandate mandateId="48393"
                mandateDesc="Tax Audit"/>
        </client>
        <client clientID="242" clientName="One Limited">
            <mandate mandateId="4325"
                mandateDesc="Sarbanes-Oxley Advisory"/>
            < mandate mandateId="24925"
                mandateDesc="Security Analysis"/>
            < mandate mandateId="49039"
                mandateDesc="Acquisition"/>
        </client>
    </sepIlSr>
</sepIlSrs>
```

As an alternative to retrieving candidate file data 8 from the buffer and look-up server 2, the mobile device 1 may retain a cache of queries and responses, and look up the other party identifier 21 in the cache prior to querying the buffer and look-up server 2. If a record corresponding to the other party identifier 21 is available in the cache, the mobile device 1 software may use the stored response.

On the completion of an interaction, the mobile device 1 software timer records the duration of the interaction in the time entry 9. If the candidate file data 8 included only one file number, that file number is recorded in the time entry 9. The mobile device 1 software preferably presents to the user a list of client numbers, file numbers and their descriptions from the retrieved candidate file data 8 and requests that the professional select one client or file number to be associated with the interaction. Other associated information available in the candidate file data 8, such as the client's name, may also be displayed to the professional in order to assist with making the selection. If the professional selects such a client or file number, that number may be recorded in the time entry 9. The professional may also be presented with the option of selecting a file number that specifies that the time is non-billable or that is a special code to alert the professional's assistant to identify the correct client or file number. Alternatively, a message could be automatically sent to the assistant requesting that he or she identify the file number for later insertion into the time entry 9. Where the interaction involved a particular e-mail or message and the professional selected a file number, that file number may be cached on the mobile device with a unique interaction identifier for the e-mail or message so that if the professional accesses the same e-mail or message again, the cached file number may be used rather than requesting that the professional select a file number again.

The professional may also be given the opportunity to review and edit the automatically generated interaction description, or to enter a new client or file number if, for example, there was no candidate file data 8 available for the other party. The professional may also be given the opportunity to record a voice message that is digitized and included in the interaction description.

After recording the interaction information in the time entry 9, the time entry 9 may be transmitted via the mobile communication network 4 to the buffer and look-up server 2 for storage. Alternatively, some number of time entries 9 may be stored in the mobile device 1 and periodically transmitted to the buffer and look-up server 2 by the mobile device 1, or the buffer and look-up server 2 may periodically poll the mobile device 1 and retrieve time entries 9 stored therein. The buffer and look-up server 2 may maintain the time entries 9 in a buffer so that batches of buffered time entries 13 can be efficiently transmitted to the time and billing server 3.

An example of an XML string encoding a time entry is:

```
<sepiBBs>
    <sepiBB clientCoordinate="joe@shmo.com"
        subject="Re: patent application" cc=""
        mandateId="54353" clientId="435"
        duration="5" from="john@doe.com"
        userInteraction="reply"
        emailText="<insert first 100 characters here (if selected)>"
        isBillable="true" datetime="2009/02/28 13:53:12" interactDesc=""
        interactDict="<amr format voice file>" isAssistant="false"/>
</sepiBBs>
```

Some or all of each time entry 9 is preferably encrypted by the mobile device 1 prior to transmission to the buffer and look-up server 2. For example, where the same buffer and look-up server 2 is used to service multiple professionals, or multiple firms of professionals, the professional identifier may not be encrypted but the remainder of the time entry 9 may be encrypted. Alternatively a firm identifier may be included as plain text, and the remainder of the time entry 9 may be encrypted.

The file number table 10 may be created and maintained remotely by the time and billing server 3. The initial list of contacts of the professional, who may be other parties in interactions, may first be populated by software on the time and billing server 3 interacting with the professional's contact management system. The initial list may be edited by the professional or an assistant from a workstation 11, or may be directly entered by the professional or an assistant from a workstation 11. For each contact, other party identifiers 21 may be determined from stored contact information, such as the contact's telephone numbers and e-mail addresses. For each contact, client and file numbers that are associated with the contact may be identified by software on the time and billing server 3 interacting with the professional's time and billing database, which information may be edited by the professional or an assistant from a workstation 11, or may be directly entered by the professional or an assistant from a workstation 11. The identified client and file numbers, with associated descriptive text and other useful information, may be formatted into candidate file data 8 for each contact. The candidate file data 8 may alternatively include an indication that the contact is not associated with billable work as in the case, for example, of a friend of the professional.

The candidate file data 8 may be formatted as an XML string. For each other party identifier 21 for a contact, the time and billing server 3 may create a file number table entry 12 to be stored in the file number table 10. The file number table entry 12 may include an encrypted index 23 to be used to index the file number table entry 12. The entry may also include the candidate file data 8 for the contact, which may be stored as plain text or encrypted, in whole or in part.

The professional, the professional's assistant, or others from the professional's firm may from time to time update the file number table 10, as new files are opened and files are closed, by transmitting new or replacement file number table entries 12 to the buffer and look-up server 2, or by deleting entries in the file number table 10.

The time and billing server 3 periodically retrieves the buffered time entries 13 from the buffer and look-up server 2, or they may be automatically transmitted at pre-scheduled times, or when the number or volume of entries reaches a pre-defined limit. Software on the time and billing server 3 may decrypt the buffered time entries 13 if they are encrypted, using a key stored on the time and billing server 3, and reformats the buffered time entries 13 into a format that is directly compatible with the professional's billing system. The buffered time entries 13 may be presented to the professional or professional's assistant on a workstation 11 so that they may be edited, for example to edit or expand interaction descriptions, to adjust the duration of interactions for billing purposes or to enter missing file numbers. The professional or professional's assistant may also transcribe any interaction descriptions that were entered by voice recording. The buffered time entries 13 may then be transmitted to the professional's billing system for posting and processing.

The buffer and look-up server 2 is preferably selected and configured to have substantially more capacity for transmitting information over the mobile communication network 4 than does the time and billing server 3, or other servers behind the professional's firewall 6. This is advantageous as it can then service a large number of mobile devices 1, which may not be possible from behind the professional's firewall 6 other than by making significant modifications to the professional's equipment or network access. By using encrypted indexes 23 as indexes and encrypting the candidate file data 8, the system ensures that no sensitive data residing on the buffer and look-up server 2 can be accessed by any third party, including any third party that owns and operates the buffer and look-up server 2. The buffer and look-up server 2 could thus be managed by a third party, stored in an insecure location, and shared with other professionals and other firms while preventing the confidentiality of the professional's client or file information being breached.

Encryption may be performed using any suitable symmetric or asymmetric encryption algorithm. For a symmetric algorithm, such as AES or 3DES, a single key could be used for the professional's firm, or a unique key could be used for each professional or mobile device 1. In the latter case, candidate file data 8 would need to be encrypted using the key of each professional who may need to access the data. A higher degree of security may be attained by encrypting candidate file data 8 with a public key for each professional who needs to access it, the corresponding private key being stored on the mobile device 1, and encrypting time entries 9 with a public key for the professional's firm, the corresponding private key being stored on the time and billing server 3. Other approaches, such as having the time and billing server 3 distribute shared keys periodically to the mobile devices 1, using a secure authentication and key distribution protocol, are also possible.

Figure 2:
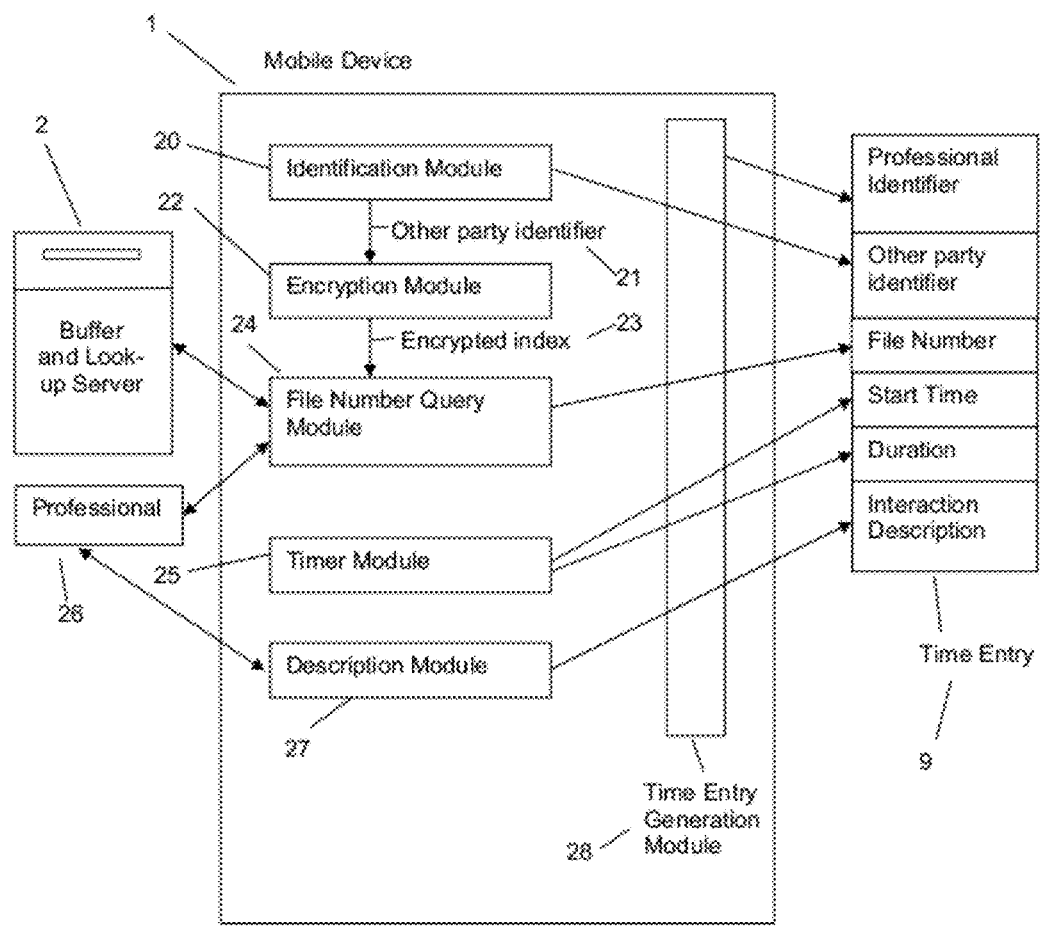
FIG. 2 shows the key processor modules in the mobile device in one embodiment and high-level data flows related to constructing a time entry.

FIG. 2 shows the processor modules running on the mobile device 1 in one embodiment that perform the functions described above, and the main data flows related to constructing a time entry 9 for a transaction. The time entry 9 may be generated by the time entry generation module 28 using information provided by the other modules, along with the professional identifier that may be stored on the mobile device 1. The time entry generation module 28 may also encrypt one or more of the fields in a time entry 9. For example, all fields may be encrypted, or all fields other than the professional identifier may be encrypted.

The identification module 20 may determine the other party identifier 21, which may be encrypted by the encryption module 22 to create an encrypted index 23. The encrypted index 23 may be used by the file number query module 24 to query the buffer and look-up server 2 which may return candidate file data 8 to the file number query module 24. Alternatively the file number query module 24 may retrieve candidate file data 8 that is cached on the mobile device 1. The file number query module 24 may then allow the professional 26 to select a file number from the file numbers in the candidate file data 8 to be provided to the time entry generation module 28 for inclusion in the time entry 9.

The timer module 25 may calculate the start time and duration of the transaction and provide them to the time entry generation module 28 for inclusion in the time entry 9.

The description module 27 may generate an interaction description specifying the type of interaction, which party initiated the interaction, and portions of the subject or body of an e-mail in the case of an e-mail transaction. The description module 27 may also provide the professional 26 with the opportunity to edit or add to the interaction description, or to record a voice description.

It will be appreciated that the above description relates to the described embodiments by way of example only. Many variations on the system and method for delivering the invention without departing from the spirit of same will be clear to those knowledgeable in the field, and such variations are within the scope of the invention as described and claimed, whether or not expressly described.

I claim:

1. A method of creating a time entry on a mobile device for an interaction occurring on the mobile device with an other party, the mobile device for use by a professional having a professional identifier, the method comprising:
   a) determining on the mobile device, by parsing data of the interaction with the other party, an other party identifier used in the interaction;
   b) encrypting the other party identifier to make an encrypted index;
   c) querying, using the encrypted index, an intermediate server for one or more encrypted possible file numbers, the intermediate server being provided outside a firewall that a billing server storing time entries is behind, wherein the encrypted index is used, in its encrypted form, to look up the one or more encrypted possible file numbers stored on the intermediate server;
   d) receiving and decrypting, at the mobile device, the one or more encrypted possible file numbers to generate one or more decrypted possible file numbers pertaining to the interaction;
   e) receiving input, at the mobile device, indicating: a selection of one of the one or more decrypted possible file numbers pertaining to the interaction, or a new file number;
   f) determining, by a timer in the mobile device, a duration of the interaction;
   g) generating a description of the interaction based on the type of interaction;
   h) creating the time entry by combining at least each of the following: the other party identifier, the selected file number or the new file number, the professional identifier, the description, and the duration of the interaction;
   i) encrypting the time entry; and
   j) transmitting the encrypted time entry to the billing server for posting.

2. The method of claim 1, wherein the time entry comprises an XML string containing XML tags.

3. The method of claim 1, wherein the other party identifier comprises at least one of: an e-mail address of the other party and a telephone number of the other party.

4. The method of claim 1, wherein an interaction identifier is stored with the selected file number or the new file number in the mobile device for future queries.

5. The method of claim 1, wherein step (f) comprises determining a start time of the interaction, and an end time of the interaction, based on active input into the mobile device, and calculating the duration from the start and end times.

6. The method of claim 5, wherein the duration takes into account pauses or interruptions between the start and end times.

7. The method of claim 5, wherein the interaction comprises an e-mail interaction, and the end time is when the e-mail is finally sent or closed.

8. The method of claim 5, wherein the interaction comprises a telephone interaction, and the end time is when the telephone call is disconnected.

9. The method of claim 5, wherein the end time is identified when an input indicating that the interaction is done is received.

10. The method of claim 1, wherein the interaction comprises an e-mail interaction, and the description is supplied at least in part by the text of the e-mail.

11. The method of claim 1, wherein the description is supplied by text entry on the mobile device following the interaction.

12. The method of claim 1, wherein the description is supplied at least in part by voice recording on the mobile device following the interaction.

13. The method of claim 1, wherein step (c) further comprises receiving a client name with the one or more possible file numbers pertaining to the interaction, and the client name is inserted into the description in step (g).

14. The method of claim 1, wherein step (c) further comprises receiving a mandate description with the one or more possible file numbers pertaining to the interaction, and the mandate description is inserted into the description in step (g).

15. The method of claim 1, wherein step (g) further comprises providing an option in a user interface of the mobile device which, when selected, electronically queries an assistant device for at least a portion of the description.

16. The method of claim 1, wherein the time entry comprises a field-delimited string.

17. The method of claim 1, wherein the encrypted time entry is transmitted to the billing server via the intermediate server.

18. A mobile device for creating a time entry that records an interaction occurring on the mobile device with an other party, the mobile device for use by a professional having a professional identifier, the mobile device comprising:
   a) an identification module for determining, by parsing data of the interaction with the other party, an other party identifier used in the interaction;
   b) an encryption module for encrypting the other party identifier to make an encrypted index;
   c) a file number query module for:
      querying, using the encrypted index, an intermediate server for one or more encrypted possible file numbers, the intermediate server being provided outside a firewall that a billing server storing time entries is behind, wherein the encrypted index is used, in its encrypted form, to lookup the one or more encrypted possible file numbers stored on the intermediate server,
      receiving and decrypting the one or more encrypted possible file numbers to generate one or more decrypted possible file numbers pertaining to the interaction, and
      receiving input indicating: a selection of one of the one or more decrypted possible file numbers pertaining to the interaction, or a new file number;
   d) a timer module for determining the start time and duration of the interaction;
   e) a description module for generating a description of the interaction based on the type of interaction; and
   f) a time entry generation module for:
      creating the time entry by combining at least each of the following:
         the other party identifier, the selected file number or the new file number, the professional identifier, the description, and the duration of the interaction,
      encrypting the time entry, and
      transmitting the encrypted time entry to the billing server for posting.

19. The mobile device of claim 18, wherein the time entry comprises an XML string containing XML tags.

20. The mobile device of claim 18, wherein the other party identifier comprises at least one of: an e-mail address of the other party and a telephone number of the other party.

21. The mobile device of claim 18, wherein an interaction identifier is stored with the selected file number or the new file number in the mobile device for future queries.

22. The mobile device of claim 18, wherein the timer module determines a start time of the interaction, and an end time of the interaction, based on active input into the mobile device, and calculates the duration from the start and end times.

23. The mobile device of claim 22, wherein the duration takes into account pauses or interruptions between the start and end times.

24. The mobile device of claim 22, wherein the interaction comprises an e-mail interaction, and the end time is when the e-mail is finally sent or closed.

25. The mobile device of claim 22, wherein the interaction comprises a telephone interaction, and the end time is when the telephone call is disconnected.

26. The mobile device of claim 22, wherein the end time is identified when an input indicating that the interaction is done is received.

27. The mobile device of claim 18, wherein the interaction comprises an e-mail interaction and the description is supplied at least in part by the text of the e-mail.

28. The mobile device of claim 18, wherein the description is supplied, at least in part, by text entry on the mobile device following the interaction.

29. The mobile device of claim 18, wherein the description is supplied, at least in part, by voice recording on the mobile device following the interaction.

30. The mobile device of claim 18, wherein the file number query module receives a client name with the one or more possible file numbers pertaining to the interaction, and wherein the description module inserts the client name into the description.

31. The mobile device of claim 18, wherein the file number query module receives a mandate description with the one or more possible file numbers pertaining to the interaction, and wherein the description module inserts the mandate description into the description.

32. The mobile device of claim 18, wherein the description module provides an option in a user interface which, when selected, electronically queries an assistant device for at least a portion of the description.

33. The mobile device of claim 18, wherein the time entry comprises a field-delimited string.

34. The mobile device of claim 18, wherein the encrypted time entry is transmitted to the billing server via the intermediate server.

\* \* \* \* \*